Sept. 17, 1968  Y. HAGIZ  3,401,796
APPARATUS FOR SORTING ARTICLES ACCORDING TO LENGTH
Filed Feb. 13, 1967
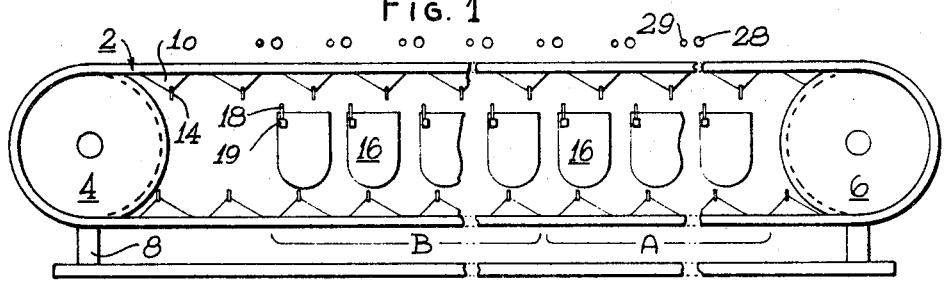
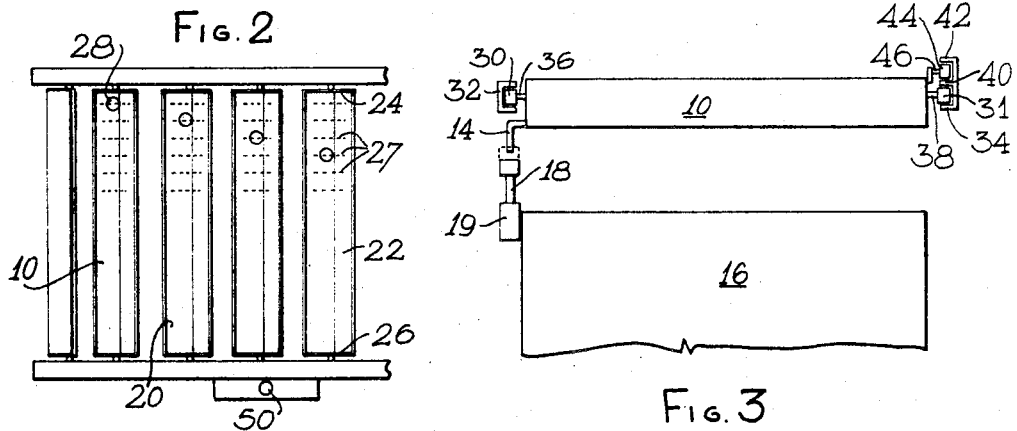
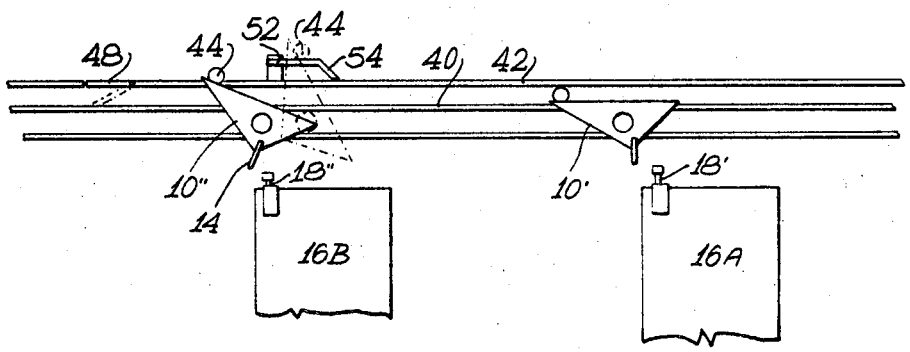
INVENTOR
YEHUDA HAGIZ
BY
ATTORNEY United States Patent Office 3,401,796
Patented Sept. 17, 1968

3,401,796
APPARATUS FOR SORTING ARTICLES ACCORDING TO LENGTH
Yehuda Hagiz, Hashoshan 5,
Ramat Gan, Israel
Filed Feb. 13, 1967, Ser. No. 615,498
8 Claims. (Cl. 209—73)

ABSTRACT OF THE DISCLOSURE

Apparatus for sorting articles, such as cut flowers, according to length comprises a conveyor having a plurality of trays for transporting the articles to be sorted, a plurality of sort bins for receiving the articles as they are sorted, and a plurality of length sensing devices, such as photocells, disposed to sense the ends of the articles and to cause the articles to be unloaded into their respective bins. Each tray includes a vertical end wall for registering one end of the article and a pair of side walls converging toward the tray bottom throughout the complete length of the tray occupied by the article to cause the article to assume a position in the tray parallel to the tray longitudinal axis.

BACKGROUND OF THE INVENTION

Field of the invention

The present invention relates to sorting apparatus, particularly apparatus for sorting cut flowers according to length. The apparatus may also be used for sorting according to another characteristic of the article, such as grade.

Description of the prior art

Apparatus for sorting articles according to length are known, but insofar as I am presently aware, the known sorters are manually and not automatically operated, or are not designed for sorting long flexible articles such as cut flowers, or are too complicated and expensive to gain widespread use for sorting cut flowers.

SUMMARY OF THE INVENTION

The present invention provides an apparatus for sorting articles according to length, which apparatus is automatically operated, is particularly useful for sorting long flexible articles such as cut flowers, and is of simple construction so that it can be produced at relatively low cost.

Briefly, the invention provides a sorter comprising a conveyor having a plurality of trays for transporting the articles to be sorted, a plurality of sort bins for receiving the articles, and a plurality of length sensing devices disposed to sense the ends of the articles and to cause the articles to be unloaded from the trays into their respective bins. Each tray includes a vertical end wall for registering one end of article carried within the tray. The side walls of each tray converge toward the tray bottom throughout the complete length of the tray occupied by the article, to cause the article to assume a position in the tray parallel to the longitudinal axis of the tray. Preferably, the tray side walls are of V-shape.

In the described embodiment, the length sensing devices includes a photocell and light source for each of the bins. There are two groups of sort bins, and by-passing means are provided for selectively causing the trays to by-pass one group of bins and to sort only with respect to the other group. This by-passing feature, which is strictly optional, may be used for sorting the articles (e.g. cut flowers) according to grade as well as according to length.

Further features and advantages of the invention will be apparent from the description below.

The invention may take several forms, but is herein described, somewhat diagrammatically and for purposes of example only, with respect to a machine for sorting cut flowers (e.g. gladioli) as illustrated in the accompanying drawings.

BRIEF DESCRIPTION OF THE DRAWINGS

FIG. 1 is a side elevational view, partly broken away, of a gladioli sorting machine constructed in accordance with the invention;

FIG. 2 is a top plan view of the front part of the machine illustrating particularly the construction of the sorting trays;

FIG. 3 is a transverse view illustrating the relationship of a moving tray with a fixed bin; and FIG. 4 is an enlarged fragmentary side elevational view illustrating the conveying and unloading movements of the trays with respect to the bins.

DESCRIPTION OF THE PREFERRED EMBODIMENT

The apparatus illustrated comprises a conveyor 2 in the form of a pair of endless chains wound around and driven by two pairs of end wheels 4 and 6, the wheels and chains being supported on a frame 8. The conveyor chains pivotably support a plurality of trays 10 each adapted to carry one of the articles (i.e., a gladiolus) which are loaded onto the trays, manually or automatically, at the left end of the machine. Each of the trays carries a depending finger 14. A plurality of sort bins 16 underly the trays 10 as they are transported by the conveyor. Each bin carries a stop 18 actuated by a solenoid 19 to raise the stop into the path of movement of a finger 14 of one of the trays when it is desired to have the bin receive the flower from that tray.

Each of the trays 10 is of trough-shape and comprises a pair of side walls 20 and 22 which converge toward the bottom of the tray, and a pair of vertical end walls 24 and 26. Vertical end wall 26 is used for registering one end of the cut flower which is placed into the tray, the flower extending along the bottom of the tray toward the opposite vertical wall 24. A plurality of transverse length markings 27 may be applied to the inside surface of the trays adjacent to end wall 26. The converging side wall construction of the tray, since it extends for the complete length of the tray occupied by the flower, causes the flower to assume a position along the bottom of the tray substantially straight and parallel to the longitudinal axis of the tray, the transverse markings 27 indicating the length of the flower.

The length sensing device in the described embodiment are in the form of a photocell 28 and a light source 29 for each sort bin 16 both disposed above the trays. The photocells are arranged along the path of movement of the trays in a staggered relationship with respect to the path of movement of vertical end walls 24 and 26 so that each is in a position to scan a different flower length as the trays are moved by the conveyor. Each photocell includes a filter so as to be sensitive only to the color of the flower, e.g., green.

The two drive chains of the conveyor system are indicated at 30 and 31 in FIG. 3 and pass within guide members 32 and 34, respectively. Each of the trays 10 is pivotably mounted to the drive chains by means of a pair of pins 36 and 38 each passing through one of the end walls 24 and 26.

As will be more particularly explained below, the device insofar as described automatically sorts the cut flowers carried in the trays 10 to the appropriate bins 16 in accordance with the length of the flower as sensed by the photocells 28. The apparatus illustrated, however, also permits the flowers to be sorted according to another feature (e.g., the grade) of the flower. For this purpose, the apparatus includes two groups of sort bins 16, indicated as group A for Grade A flowers, and group B for Grade B flowers, and presetting means for causing the trays to by-pass one group of bins and to sort only with respect to the other group.

For permitting grade sorting, a pair of horizontal rails 40 and 42 (FIGS. 3 and 4) are fixed one above the other along one side of the apparatus just above the drive chain 28. Each tray 10 is provided with a roller 44 secured to it by a pin 46 adapted to roll along one or the other of the rails 40 and 42. Normally, rollers 44 roll along the lower rail 40 as the trays are moved towards the bins 16 by the conveyor chains. A pivotable gate 48 is provided ahead of both groups of sorting bins for selectively steering the rollers 44 of each tray either to the lower rail 40 or to the higher rail 42. In the full line (horizontal) position of gate 48 as shown in FIG. 4, the roller would be steered to the lower rail 40, and in the pivoted broken-line (inclined) position of the gate, the roller would be steered to the upper rail 42. A manual control in the form of a depressible knob 50 (FIG. 2) is provided at the forward side of the apparatus linked to gate 48 so as to enable the manual presetting of the gate in either of its two positions. The bin stops 18', FIG. 4 for the group A bins (16A) are higher than those (18'', FIG. 4) for the group B bins (16B).

The apparatus described above operates as follows: A gladiolus is placed on each tray at the forward end of the apparatus (left end in FIG. 1) with the lower end of each gladiolus placed against the vertical side wall 26 of its tray. Because of the converging side walls, the gladiolus will lie substantially flat, straight, and parallel to the longitudinal axis of the tray.

If the gladiolus on the tray is of a grade B type, it is to be sorted to the group B bins (16B, FIG. 4). For accomplishing this, the operator manually depresses knob 50 before the tray arrives at the first of the bins. This causes gate 48 to pivot to its inclined position, steering roller 44 of that tray to the upper rail 42. The tray is thus partially tilted (as shown by tray 10'', FIG. 4) whereby the tray finger 14 is lowered somewhat. Now, as the tray arrives at each bin, the photocell 28 for that bin will sense the length of the flower. The arrangement of photocells as illustrated in FIG. 2 is such that the light to the first photocell (the left-most in FIG. 2) will be intercepted only by the longest flower, and the light to the succeeding photocells will be intercepted by successively shorter flowers. Thus, if the flower in the tray is of the longest one to be sorted by the apparatus, the light to the left-most photocell 28 will be intercepted. This will actuate solenoid 19 of the left-most bin 16, causing bin stop 18 to rise into the path of finger 14 for that tray. As the tray is moved by the conveyor, it will be pivoted (as shown in broken lines in FIG. 4) whereby its contents will be emptied into that bin.

If the flower is of shorter length, then the light to the left-most photocell 28 will not be interrupted, but rather the light to one of the succeeding photocells will be interrupted, which will actuate in a similar manner the solenoid 19 for that bin just before the tray arrives to it. Thus, the gladiolus will be sorted to one of the group B bins 16 according to its length.

If the gladiolus is of the grade A type, manual knob 50 would not be depressed. Roller 44 of that tray (indicated by tray 10', FIG. 4) will thus ride along the lower rail 49. The tray finger 14 will pass over all the bin stops 18'' of the group B bins, even though the photocell of one of those bins is actuated, because finger 14 is now above all the bin stops 18''. As the tray arrives to the group A bins, since their bin stops 18' are higher than bin stops 18'', the stop actuated by the photocell sensing the length of the gladiolus will be moved into the path of the tray finger to cause the pivoting of the tray and the unloading of the gladiolus into the appropriate group A bin.

After the tray unloads its contents and its finger 14 disengages from bin stop 18, the tray returns to its normal untilted position by gravity. In order to retard or cushion this return so as to avoid jolts to the apparatus, a return control member 52 (FIG. 4) is provided for each bin. This member includes an inclined surface 54 adapted to be engaged by the roller 44 to cause the gradual return of the tray from its tilted unloading position to its normal untilted position.

It will be appreciated that various modifications could be made in the described embodiment. For example, the tray side walls could be of a concave shape, rather than a V-shape. The photocells could be operated by direct light, as by the provision of slots in the trays, rather than by reflected light, as illustrated. Instead of using photocells for detecting the lengths of the cut flowers, electrical switches could be used having operators coming into direct contact with the flower. In this case, a mechanism would be provided for raising the switches to clear the upper sides of the trays when they pass under, and then lowering the switches to sense the flower. Further, instead of having a manual control knob 50 for sorting as to grade, there could also be an automatic control, for example another photocell system for sorting as to color. The grade sorting could of course be omitted and only one group of bins used.

Further modifications, variations and applications of the described embodiments may be made without departing from the spirit or scope of the invention as defined in the following claims.

I claim:

1. Sorting apparatus for sorting long flexible articles, such as cut flowers, according to length, comprising a conveyor having a plurality of trays for transporting the articles to be sorted, and a plurality of sort bins for receiving the articles as they are sorted, characterized in that each tray includes a vertical end wall at one end thereof for registering one end of the article therein and a pair of side walls converging toward the tray bottom throughout the complete length of the tray occupied by the article to cause the article to assume a position in the tray substantially straight and parallel to the longitudinal axis of the tray, said apparatus further including a plurality of length sensing devices each disposed to sense the end of the article opposite to the said one end thereof, and a plurality of control devices actuated by said length sensing devices for causing the trays to unload the articles disposed therein into their respective bins.

2. Sorting apparatus as defined in claim 1, wherein said side walls of the tray are of V-shape for the complete length of the tray.

3. Sorting apparatus as defined in claim 1, wherein said length sensing devices include a photocell and a light source for each of said bins disposed along the path of movement of said trays.

4. Sorting apparatus as defined in claim 1, wherein each tray is pivotably mounted to the conveyor and includes a depending finger, and wherein each bin includes a stop underlying the path of movement of said tray fingers, each stop being extendible upon actuation of its respective control device to engage the tray finger and to cause the tray to pivot and to unload its article into the bin.

5. Sorting apparatus as defined in claim 1, wherein each tray is pivotally supported between conveyor chains, said apparatus further including a rail, each tray containing a roller riding along said rail as the tray is transported by the conveyor chains, said rail carrying a return control member for each bin having an inclined surface engaged by the roller of the tray after the tray is pivoted for returning the tray to its normal position.

6. Sorting apparatus as defined in claim 1, further characterized in that the apparatus includes two groups of sort bins and by-passing means for selectively causing the trays to by-pass one group of bins and to sort only with respect to the other group.

7. Sorting apparatus as defined in claim 6, wherein said by-passing means comprises a device for partially tilting the trays to a position between their conveying and their unloading position.

8. Sorting apparatus as defined in claim 7, wherein the partial tilting device includes a pair of horizontal rails fixed one above the other, a roller carried by each tray adapted to roll along one or the other rail, and a steering device adapted to steer the roller of each tray selectively to one or the other horizontal rail.

References Cited

UNITED STATES PATENTS 3,349,905  10/1967  Crawford _____ 209—82

ALLEN N. KNOWLES, *Primary Examiner.*